July 20, 1948.  J. F. AILINGER  2,445,464
SLIDE RULE
Filed May 27, 1944  2 Sheets-Sheet 1
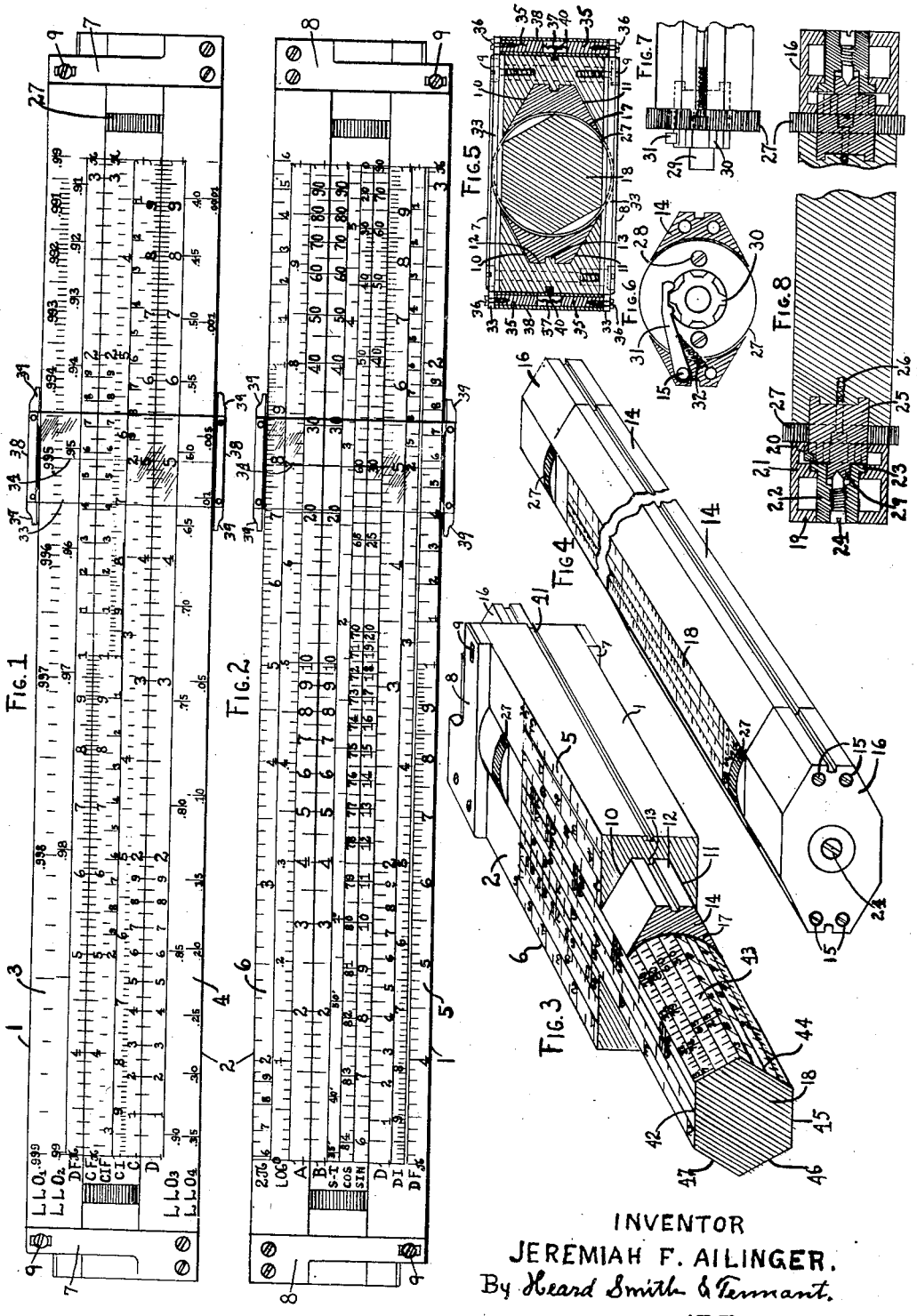
INVENTOR
JEREMIAH F. AILINGER.
By Heard Smith & Tennant.
ATTORNEYS.

July 20, 1948.  J. F. AILINGER  2,445,464
SLIDE RULE
Filed May 27, 1944  2 Sheets-Sheet 2

| | LEFT INDEX | | RIGHT INDEX | |
|---|---|---|---|---|
| 3 — | LLO 1 | .9990 | | |
| | LLO 2 | .9905 | .9905 | |
| | DF | π | .9048 | BODY |
| | | | π | |
| | D | 1 | | |
| 4 — | LLO 3 | .9048 | 1 | |
| | LLO 4 | .3679 | .3679 | |
| | | | .0000454 | |

| | | | | |
|---|---|---|---|---|
| 42 — | B | 1 | 100 | |
| | S-T | 34' | 5°44' | |
| | COS | 84°16' | 0° | |
| | SIN | 5°44' | 90° | |
| 43 — | COT< | 45° | 5°43' | |
| | TAN> | 45° | 84°17' | |
| | COT> | 84°17' | 45° | |
| | TAN< | 5°43' | 45° | |
| 44 — | CF | π | π | |
| | CIF | 1/π | 1/π | |
| | CI | 1 | 1 | |
| | C | 1 | 1 | SLIDE |
| 45 — | B | 1 | 100 | |
| | LL 1 | 1.01005 | 1.1052 | |
| | LL 2 | 1.1052 | ε | |
| | LL 3 | ε | 22026 | |
| 46 — | CF | π | π | |
| | CIF | 1/π | 1/π | |
| | CI | 1 | 1 | |
| | C | 1 | 1 | |
| 47 — | RAD. θ | 572 | 572 | |
| | KS | 1 | 1000 | |
| | CSC | 90° | 5°44' | |
| | SEC | 0° | 84°16' | |

| | | | | |
|---|---|---|---|---|
| 6 — | 2π | 1/2π | 1/2π | |
| | L | 0 | 1.0 | |
| | A | 1 | 100 | BODY |
| 5 — | D | 1 | 1 | |
| | DI | 1 | 1 | |
| | DF | π | π | |

Fig. 9

INVENTOR.
Jeremiah F. Ailinger
BY
Heard, Smith & Tennant
Attorneys

Patented July 20, 1948

2,445,464

UNITED STATES PATENT OFFICE 2,445,464

SLIDE RULE

Jeremiah F. Ailinger, Dorchester, Mass.

Application May 27, 1944, Serial No. 537,574

22 Claims. (Cl. 235—70)

This invention relates to improvements in slide rules and the general object of the invention is to provide a slide rule of greater capacity and flexibility than slide rules heretofore produced.

Another object of the invention is to provide a slide rule of the character described herein which will enable computations to be made with greater facility and accuracy than by slide rules heretofore produced.

Usual slide rules in general use are of three types; one comprises a body having a single face provided with a longitudinal channel in which the slide is movable longitudinally and provided with logarithmic scales which cooperate with complementary scales upon the upper and lower sections of the face of the body. In some rules of this type the slide is reversible and different logarithmic scales provided upon each side of the slide. Another slide rule comprises spaced side bars having their inner edges recessed to provide a guideway for a longitudinally movable slide, the upper and lower faces of the body being respectively provided with logarithmic scales and the slide provided with logarithmic scales complementary to a certain scale or scales upon the front and/or reverse faces of the side bars. The third slide rule is of a cylindrical type comprising a cylindrical slide rotatable about its axis upon which are scales complementary to one or more scales upon the face of the body.

One of the objects of the present invention is to provide a slide rule having a polygonal rotatable slide provided with several flat faces each preferably bearing a plurality of logarithmic, and/or trigonometric scales complementary to the logarithmic scales upon the front face or the front and back faces of the body and adapted to be positioned in substantially flush cooperative relation thereto, thereby enabling a greater number of scales to cooperate with the scales upon the body in performing a computation, and also enabling a greater number of full length scales to be employed in such manner as to increase the accuracy of the computation. Such scales give values which may be used directly. Slide rules not employing this feature of the present invention impose the necessity of making a preliminary solution, viz. either of rewriting and substituting known equivalents of a factor or factors, or of actual computation of any equivalent necessary to the successful solution of a problem.

A further object of the invention is to provide a slide rule comprising a body having parallel side bars having front and back faces with logarithmic scales thereon and having oppositely disposed guideways along their inner edges with a multi-faced polygonal slide rotatably mounted in a housing which is movable longitudinally of said guideways and which is provided with diametrically opposite flat faces having logarithmic, and/or trigonometric scales thereon adapted to be adjusted rotarily into the planes of said front and back faces and substantially flush therewith, and comprising a runner having like indexes co-operating respectively with the front and back faces of the body thereby enabling the result of the computation performed upon one face of the slide rule to be continued upon the reverse face thereof by a suitable manipulation of the slide housing and the positioned scales contained therein.

A further object of the invention is to eliminate the limitations of conventional slide rules relating to trigonometric functions. The conventional rule usually identifies two of the functions directly and other functions by color coded double numbered scales or complementary angles or both to denote cosines the tangents greater than 45° and also cotangents from these same scales, while the secant or cosecant are not assigned to any scales but must be derived by "identity" either by the reciprocal pair form or by their natural value which must be computed. Such elimination of limitations is accomplished by the present rule by presenting each of the six trigonometric functions on separate scales and plainly identified, so as completely to avoid any of the confusion usually experienced by slide rule operators when dealing with complementary angles. By reason of the present invention the complement of any angle may be read directly by referring to the complementary function with the natural value of any function on the C scale, its value squared on the B scale, or its value cubed on the KS scale. This eliminates reading the values of tangents greater than 45°, and cotangents less than 45° on a reciprocal scale. This further allows the option of reading the reciprocal of all six trigonometric functions on the CI scale to obtain the natural reciprocal value, or of using the direct reading scales in solution of trigonometric problems.

A further object of the invention is to increase the value of the slide rule by the introduction of log log scales and KS scales on a face or faces of the rotatable slide and also full unit length radian and log log scales of decimal quantities as will more fully appear from the detail construction and method of operation and the illustrative problems hereinafter set forth.

A further object of the invention is to provide a slide rule of the character above described having a rotatable polygonal slide mounted in a sliding housing with means for releasably locking a selected face of the slide in a position flush with the face of the body having a scale complementary to that upon the selected face.

A further object of the invention is to provide adjustable means for accurately centering the rotatable polygonal scale in the heads of the housing and preferably also providing means for easily rotating the polygonal slide to present the scales upon a selected face thereof in proper correlation to a scale or scales upon the body.

These and other objects and features of the invention will more fully appear from the following description and the accompanying drawing and will be particularly pointed out in the claims.

A preferred embodiment of the invention is illustrated in the accompanying drawing, in which Fig. 1 is a plan view of the front face and the runner slidably mounted thereon;

Fig. 2 is a plan view of the back of the slide rule illustrated in Fig. 1 illustrating also the reverse side of the runner with a hairline indicator in alinement with that upon the side of the runner which cooperates with the front face of the rule thereby enabling the computation performed upon one face of the cooperating scales to be continued upon the other face;

Fig. 3 is a detail perspective view partially in section illustrating the body of the slide rule, the rotatable slide and the housing therefor slidably mounted in the body, with the bottom face of the slide rule uppermost;

Fig. 4 is a perspective view of the rotatable polygonal slide enclosed in the housing;

Fig. 5 is a transverse vertical sectional view showing also the brackets connecting the side bars of the body and means for adjusting the same to compensate for distortion and to provide proper frictional engagement between the housing and the side bars of the body;

Fig. 6 is an end view, partially in section, of the rotatable slide and its housing and illustrating means for releasably locking the slide when a selected face thereof is in cooperative relation to a face or faces of the body;

Fig. 7 is a detail side elevation of the construction illustrated in Fig. 6;

Fig. 8 is a median longitudinal sectional view centrally broken away of the rotatable polygonal slide and the heads of the housing therefor showing the means for accurately centering the rotatable slide, the means for rotating it, and means for locking it in selected position;

Fig. 9 is a schematic drawing showing the relative position of the various scales, their first and last graduations and the direction in which the values increase.

The slide rule embodying the present invention comprises essentially a body having a flat face provided intermediate of its width with a longitudinal undercut recess in which is mounted a rotatable polygonal slide having flat faces selectively rotatable into the plane of the body. The face of the body is provided with a logarithmic scale or preferably a plurality of logarithmic scales upon either side of the entrance to the recess and the flat sides of the polygonal slide are provided with a scale or a plurality of scales mainly full length scales complementary to one or more of the scales upon the body. Means are provided for releasably locking the slide against rotation when the scale bearing face thereof is flush with a face of the body so that computations may be made by manipulating the slide longitudinally of the body as in usual slide rules, it being apparent however that the capacity of the slide rule is greatly increased by reason of the multiplicity of scales provided upon the several flat sides of the polygonal slide.

Desirably the polygonal slide is rotatably mounted in a housing which is slidably movable in ways in the body and suitable means are provided for rotating the slide to position a selected face thereof in the plane of the face of the body and in suitable cooperative relation to a complementary scale upon the face of the body.

In the construction illustrated in the drawing the body comprises parallel side bars 1 and 2, preferably of wood or plastic composition, which are suitably spaced apart to provide a recess therebetween in which the slide and its housing are longitudinally movable in either direction. As illustrated in Fig. 1 the upper and lower faces 3 and 4 of the side bars 1 and 2 are provided with a plurality of suitable scales and the lower and upper faces 5 and 6, Fig. 2, of the side bars 1 and 2 are likewise provided with a plurality of suitable scales as will hereinafter more fully appear. Suitable front and back plates or L-shaped brackets 7 and 8 with a concavity on one side of each bracket connect the ends of the side bars together. Desirably these brackets are provided with means for adjusting the spacing of the side bars, such as screws 9 mounted in suitable slots in like end portions of each of the brackets, the L-shaped brackets being provided for the purpose of enabling the ends of the slide to be readily grasped by the operator.

The inner edge of each side bar is provided with a re-entrant preferably angular channel or groove having upper and lower walls 10 and 11 converging from the inner edges of the side bars and desirably are provided with flat end walls 12 provided with a longitudinally inwardly extending tenon 13 providing a guideway for the housing of the slide. The slide housing comprises like longitudinally extending side members 14 complementary to the channel or groove in the side bars the ends of which are secured by suitable means, such as screws 15 to heads 16 the walls of which are continuations of the walls of the side members of the housing. The housing members 14 intermediate of the heads 16 are provided with cylindrically concave faces 17 within which a polygonal slide 18 is rotatably mounted in such a manner that the flat faces of the slide 18 may selectively be rotated into the plane of and fit within the space between the inner edges of one or preferably both faces of the side bars.

Desirably means are provided for accurately centering the rotatable polygonal slide in the heads of the housing with means for enabling the operator readily to rotate the slide and means for releasably locking the slide when a selected face is properly positioned in the plane of the face or faces of the side bars.

A preferred construction for accomplishing this purpose is illustrated in Figs. 6–8 inclusive in which each head is shown as a chambered member having an outer end wall 19 the inner end wall 20 and an intermediate wall 21. A sleeve 22 having an inner peripheral flange 23 seated in the intermediate wall 21 extends through the outer wall 19 and is provided with an internal screw thread in which a centering screw 24 having a conical point is adjustably mounted. The polygonal slide 18, which desirably is of wood, plastic composition, or other suitable material, has preferably metal blocks 25 axially mounted in its ends and secured therein by axial screws 26. A narrow cylindrical wheel or disk 27 having a milled periphery is mounted upon the block 25 and secured to the slide by screws 28, as shown in Fig. 6. The block 25 has a cylindrical end portion or journal 29 which is journaled in a suitable bearing in the inner end of the sleeve 22 and is provided at its end with a conical recess which is engaged by the conical end of the adjusting screw 24.

Suitable means are provided for releasably locking the slide against rotation when a selected face thereof is properly positioned with respect to a face of the side bar. As illustrated in Figs. 6–8 the block 25 is peripherally recessed to provide a series of equally spaced teeth 30 which are adapted to be engaged by the recessed end of a pawl 31 the opposite end of which is pivotally mounted upon one of the screws 15 which secure the head to the side members of the housing and a spring 32 serves to maintain the pawl 31 releasably in engagement with one of the teeth 30 corresponding to the selected face which is to be positioned in cooperative relation to the face of the slide.

Preferably, but not necessarily, each face of the polygonal slide is provided with a plurality of longitudinally extending scales adapted to coact with a complementary scale upon a face on the side bars.

A suitable runner is slidably mounted upon and movable longitudinally of the side bars and provided with like alined indexes cooperating respectively with the scales upon the front and back faces of the side bars. The runner desirably comprises parallel transparent plates 33 of suitable width extending across the front and back faces of the side bars with suitable means connecting the same to cause them to move in unison longitudinally of the rule. The transparent plates are provided with transverse hairlines 34 in the same vertical plane adapted to cooperate with scales upon opposite sides of the rule so that when a computation is made upon one side of the rule it can be readily transferred to the other by merely reversing the rule.

Any suitable means may be provided for rigidly connecting the plates 33. It is desirable however that suitable means be provided which will so support the plates that they will pass over the scales on the respective sides of the rule without frictional engagement therewith and more important to provide yieldable means to permit the plates to be separated sufficiently to enable the rotation of the polygonal slide to present different faces in substantially the planes of the upper and lower faces of the slide rule. A preferred means for accomplishing this purpose comprises complementary pairs of brackets 35 of rectangular cross section of suitable material, such as aluminum or plastic, and of the same length as the width of the plates 33 which are secured to the respective plates 33 by screws 36 and the adjacent edges of which are connected by suitable coiled springs 37 adapted to yield when the polygonal slide is rotated to position different faces of the slide in parallelism with the faces of the side bars.

Desirably the brackets 35 are retained in place by rectangular housings 38 which serve as guides for the brackets during the separation and the return thereof by the springs 37, the housings being of such vertical width as to position the plates 33 in close proximity to but not in frictional contact with the upper and lower faces of the side bars 1 and 2.

Desirably the ends 39 of the housings extend beyond the ends of the brackets 35 and are tapered to provide a streamline construction which will avoid the catching of the ends of the runner upon the clothing of the operator or upon a case enclosing the slide rule.

Suitable means such as leaf springs 40, which are secured centrally to the inner side walls of the housing 38, are provided to engage the longitudinal grooves 41 in the side bars 1 and 2. By reason of the construction described the housings 38 are guided in exact parallelism and are retained from upward and downward displacement when the transparent plates are separated and returned to a position as the polygonal slide is rotated to bring opposite faces thereof into parallelism with and substantially flush with the upper and lower faces of the side bars.

By reason of the spring connection 37 to the brackets 35 the transparent plates also serve to prevent undesirable rotation of the polygonal slide when the opposite faces thereof are substantially flush with the upper and lower faces of the side bars thereby enabling the omission if desired of the toothed locking block 30 and the locking pawl 31.

In the preferred embodiment of the invention illustrated herein the polygonal slide 18 is of an hexagonal cross section, diametrically opposite walls of which are adapted to be positioned flush with the upper and lower faces of the side bars, but it will be understood that by suitable adjustment or construction other forms of rotatable polygonal slides having symmetrical faces may be employed such as triangular or preferably octagonal or other even numbered symmetrical faces may be employed.

The respective faces of the rotatably polygonal slide may be provided with any suitable longitudinally extending standard logarithmic and/or trigonometric scales adapted to coact with a selected logarithmic scale or scales upon the face or faces of the side bar or body of the rule and the scales upon the respective faces of the polygonal slide may be arranged in any desirable order or sequence, and it will be noted that all the scales illustrated herein excepting only usual A, B, KS scales are of full unit length so as to provide maximum accuracy in computation of the problem and for purpose of brevity in this description the phrase "full unit length" will be omitted but understood unless otherwise specified. Such "full unit length" scales may also be termed "one cycle" scales as these terms are used synonymously in the art.

On the front face 3 of the side bar 1 the top scale is identified as a log log scale $LL0_1$ and is continued in the log log scale beneath it identified as $LL0_2$ to form one-half of the continuous log log scale of decimal quantities. The other half of this continuous log log scale is located upon the lower front face 4 of the side bar 2 being the scales identified as $LL0_3$ and $LL0_4$ which is immediately beneath it. These four scales constitute a continuous log log scale of decimal quantities of full unit length representing logarithms of cologarithms of the numbers between 0.000045 and 0.999 and are employed both to find cologarithms to any base of numbers below unity and to find powers and roots of numbers below unity. The $LL0_1$ scale covers the range closest to unity i. e. .9990 to .9905, the $LL0_2$ scale the next range from .9905 to .9048 and so on for the $LL0_3$ and $LL0_4$ respectively to .0000454. Unlike the log log scales of decimal quantities on the conventional slide rule which are referred to a two unit length scale, these scales are referred to the D scale of full unit length for greater accuracy.

The D scale which appears upon the front face 4 of the lower bar 2 represents the natural cologarithms of the numbers on the $LL0_1$, $LL0_2$, $LL0_3$, $LL0_4$ scales and is a standard logarithmic scale with graduations from 1 to 10 and a replica of scale C on one of the faces of the polygonal slide with which it coacts.

Immediately below the $LL0_2$ scale on the upper face 3 of the side bar 1 and adjacent to the inner edge thereof is a folded scale identified as DF and is a standard scale similar to the D scale except that it is folded with the value of $\pi$ at the indices of the rule. It is designed to coact with the CF and CIF scales upon the complementary face of the slide as shown in Fig. 1. The reverse or back face of the side bar 2 (Fig. 2) is provided with scales identified respectively as follows: On the face 6 of the bar 2 as $2\pi$, LOG, and A and on the back face of the side bar 1 with scales identified as D, DI, and DF. The scale identified as $2\pi$ at the upper edge of the side bar 2 is a single indexed standard logarithmic scale folded at the value of $$\frac{1}{2\pi}$$

and is invaluable for use in any type of problem in which this constant is used, such as radio, electrical and mechanical engineering, etc., for example, by placing the runner at any number on this scale that number automatically multiplied by $2\pi$ will be found without moving the runner on the D scale. The scale LOG just below the $2\pi$ scale is an equidivided scale of ten parts from 0.0 to 1.0 and is used in finding common logarithms of the numbers on the D scale. The scale A which is below the LOG scale is a two unit length scale of standard logarithmic type designed to coact with the B scale and represents the value (squared) of numbers on the D scale or the value (squared) of any trigonometric function (if the indexes of the A scale and the B scale upon a face of the polygonal slide are alined it is exactly like the polygonal slide with the B scale thereof.)

The following scales are also on the back face 5 of bar 1. The scale identified as D is exactly the same as the D scale already described on the front face. The scale identified as DI (preferably printed in red) is beneath the D scale and is a standard reciprocal logarithmic scale like D but inverted, the graduations being from 10 to 1 reading from the left. The DF scale which is below the DI scale is identical with the scale DF on the front face heretofore described.

The hexagonal rotatable slide is shown herein as having the flat face 42 flush with the back faces 5 and 6 of the side bars 1 and 2 and bears the scales identified as B, ST, COS, and SIN, as shown in Figs. 2 and 3.

The scales appearing upon the several faces of the rotatable hexagonal slide appear in the following sequence as the slide is turned in a counterclockwise direction, it being understood that each of the scales rotates through 360°.

The scale which appears on the face 42 and is identified as B is a two unit length scale of standard logarithmic type, and identical with A, except that it rotates. Its property of rotation makes it invaluable for use as a means of finding squares or square roots, regardless of which side of the rule the operator is working with, and serves as an automatic computor of the value squared of each of the trigonometric functions, irrespective of the position of the slider section. Its principal function however is coacting with scales A and D in the solution of problems involving squares and square roots, in simultaneous progressive operations.

The scale identified as S—T is a scale of sines and tangents whose natural value is less than 0.1. It is numbered from 0° 34′ to 5° 44′.

The scale identified as COS is a scale of cosines from 84° 16′ to zero degrees. This scale eliminates the necessity of reading the cosine of an angle, as a complement to the sine. Where rewriting a problem is desirable the cosine scale gives the exact reciprocal value of the secant function, completely avoiding the confusion which often arises in conversion from the secant to a complementary angle of the sine. It is designed primarily to coact with D, and permits undisturbed progression of operations of solution, if cosines are involved.

The scale identified as SIN is a scale of sines from 5° 44′ to 90°. It may be used to give the exact reciprocal value of the cosecant function if desired. Designed to coact with D scale, it permits undisturbed progression of the operations of a solution if sines are involved.

The scales which appear on the next adjacent face 43 are as follows:

The scale identified as COT< is a scale of cotangents from 45° to 5° 43′.

The scale identified as TAN> is a scale of tangents from 45° to 84° 17′.

The scale identified as COT> is a scale of cotangents from 84° 17′ to 45°. Together with COT< this scale forms a continuous scale of cotangents from 84° 17′ to 5° 43′.

The scale identified as TAN< is a scale of tangents from 5° 43′ to 45°. Together with TAN> this scale forms a continuous scale of tangents from 5° 43′ to 84° 17′.

The scales which appear on the next face 44 (Fig 3) are identified as follows:

The scale identified as CF is a standard folded logarithmic scale, single indexed, and is exactly like DF. It allows factors to be used which are "off scale" and would require resetting the slider. It is designed to coact with DF.

The scale identified as CIF is a standard logarithmic reciprocal, folded scale, representing the reciprocals of numbers on the CF scale.

The scale identified as CI is a standard reciprocal logarithmic scale. It is the same as C but inverted, with graduations from 10 to 1.

The scale identified as C is a standard logarithmic scale exactly like D with which it coacts, providing means whereby factors which are given, or are roots, either square or cubic, automatically extracted from values on B or KS scales, or represent the natural values of any of the six trigonometric functions, may be used in a continuous progressive solution.

The scales which appear upon the next face 45 are B which is exactly like the B scale already described on face 42 and the scales $LL_1$, $LL_2$, $LL_3$, which are convenient continuations of each other and represent the logarithms of logarithms of the numbers from 1.01 to 22,000 or $e^{.01}$ to $e^{10}$. The $LL_1$ scale covers the range closest to unity, the LL₂ scale the next range and the LL₃ scale the next range away from unity.

The scales which appear on the next face 46 are exactly the same as the set of scales on the face 44 already described, and perform the same functions, the purpose of duplication is to reduce to a minimum the amount of rotation necessary to bring these scales into register with either face of the rule.

The duplicated scales may be replaced if desired by other scales suitable to individual requirements of the operator and this would add five more scales to the rule, giving it additional flexibility.

The scale which appears on the face 47 is identified as RAD θ (radian θ) and is a standard logarithmic scale folded at the value of 572 (57.2) which is the equivalent of the degree value of one radian, and is designed to coact with D scale in problems involving radians in simultaneous operations. The value in radians of the angle given in degrees or decimal fraction thereof and conversely the angle in degrees or decimal fraction thereof subtended by N radians is automatically given. If desired the radian value may be read at any time on the C scale regardless of the position of the slider.

The scale on face 47 identified as KS is a standard three unit length logarithmic scale identical with the K scale on conventional slide rules excepting that it is on the sliding section which greatly increases its ability to handle factors involving cubes or cube roots, regardless of how many times they appear in a problem. It is designed to coact with D and C scales in the solution of problems by progressive simultaneous operations.

The scale on face 47 identified as CSC (cosecant) is a scale of cosecants from 90° to 5° 44'. This scale eliminates the necessity of reading the cosecant, as the reciprocal of the sine function, which is the practice on conventional slide rules, and completely avoids the possible confusion which often accompanies a handling of the cosecant function. If necessary in rewriting problems the CSC scale gives the exact reciprocal value of the sine function. It is designed to coact with D, in permitting simultaneous progressive operations in the solution of problems involving this function. The natural value of the function may be had at any time by referring to the C scale, regardless of the position of the slider.

The scale on face 47 identified as SEC (secant) is a scale of secants from zero degrees to 84° 16'. This scale eliminates the necessity of reading the secant function as an identity, which is the reciprocal of the cosine function which is in turn read as the complementary angle of the sine on the conventional slide rule. This completely avoids the possibility of confusion which often accompanies the conversion from one function to the reciprocal of another which in turn is the complement of another function. If necessary in rewriting problems, a secant scale will give the exact reciprocal value of the cosine function. It is designed to coact with the D scale, in permitting simultaneous progressive operations in the solution of problems involving this function, the natural value of the function may be had at any time by referring to the C scale regardless of the position of the slider.

It is to be noted from the above description that identical scales appear upon the faces 44 and 46 and one scale B upon faces 45 and 42 of the rotatable hexagonal slide (and are therefore not positioned as might be assumed from the illustrations in Figs. 1 and 2).

It will be seen from the above description that all the scales are logarithmic or trigonometric and appear in either single decade or unit, double decade or unit, and triple decade or unit, and that angular functions are given in degrees and minutes with the title of each function appearing at the left of each scale.

The slide rule above described possesses all of the features of the conventional slide rules including appearance and is simpler in operation, but with a scope immensely greater than that of conventional slide rules, which makes it an instrument capable of use in all engineering professions as well as by the student, navigator or merchant. The scope of this slide rule can be realized by comparing the space available on the slide of the ordinary slide rule which is usually equipped with three or four scales, whereas the slide rule embodying the present invention has six sides upon which each of three or four scales are present, any one of which may be put in register with the logarithmic scales on either face of the rule and without removing the slide from the body of the rule and turning the slider over to place it in register with the other face of the rule. Thus any problem may be set up in the usual way and its result may be read as an integer multiplied by 10 to the plus or minus of Nth power, (it being understood that 10 to the zero power equals 1) and results in a direct reading. The result thus obtained can be immediately translated into the value of any trigonometric function with direct reading in degrees and minutes of the angle involved in the trigonometric function.

The operation of the slide rule embodying the present invention follows accepted practice of good slide rule proficiency by writing or rewriting the problem so that it is presented as a problem involving division and multiplication so that the final product is the result. In order to perform the evolutions of the solution by a minimum number of operations it is essential that: (a) the numerator shall have one more factor than the denominator; (b) that the condition (a) may be satisfied by using the number 1 as a factor, as many times as is necessary to satisfy the condition (a), or, by the removal of any factor from either the numerator or denominator, and the replacement of the removed factor with its reciprocal in the opposite side of the ratio from that which contained the original factor.

The present slide rule takes full advantage of the presence on the rotating slide of scales B a two unit logarithmic scale designed to coact with scale A, but, due to its ability to rotate can be used to give values of the square of any of the trigonometric functions which appear on the same rotating member, as also the squares of any number on scale C, without the necessity of removing the slide or reference to the reverse side of the rule or of bringing the indices of the slide and the complementary scale on the body of the rule in register. Thus at any time during the process of solution, the natural value squared of any of the trigonometric function, or the value squared of any number on the C scale can be automatically substituted at will by simply rotating the scale until scale B appears.

A similar advantage holds for the scale KS. Where heretofore the K scale appears on the body of the rule, this slide rule makes full use of the KS scale on the rotating member, making it available as a factor involving cubes and cube roots in the most flexible manner, namely, that of its presence on the sliding section. This also provides for substitution of cubes or cube roots of any of the trigonometric functions or of values of numbers on the C scale without the need of removing the sliding section, or bringing the indices of the body and the sliding section in register. The manner is the same as that already described by simply rotating the slide until the KS scale shows on the face of the rule.

It will be noted that in many of the problems which follow valuable use is made of the reciprocal pair identities of trigonometry, viz.

$$\mathrm{Sin}=\frac{1}{\mathrm{Csc}};\ \mathrm{Cos}=\frac{1}{\mathrm{Sec}};\ \mathrm{Tan}=\frac{1}{\mathrm{Cot}};\ \mathrm{Cot}=\frac{1}{\mathrm{Tan}};\ \mathrm{Sec}=\frac{1}{\mathrm{Cos}};\ \mathrm{Csc}=\frac{1}{\mathrm{Sin}}$$

Extended use of these identities, in writing or rewriting the problems encountered in slide rule practice, will result in a proficiency which is not common to most users of the slide rule. For this reason full scales of all the trigonometric functions, each of which is identified by name, rather than by color coded or double numbered complementary scales, present in some slide rules, is a feature of this slide rule and completely avoids all confusion.

The greater capacity and flexibility of the rule embodying the present invention and the greater accuracy thereof by reason of the presence of full length scales as compared to conventional scales is illustrated in the following sample problems, it being understood that certain of the scales appearing respectively upon the opposite faces of the body and certain of the faces of the polygonal slide may be and desirably are similar to or identical with those of conventional slide rules.

The following problems 1 and 2 are comparatively illustrative of one of the advantages of the present rule as compared with conventional slide rules.

*Problem No. 1.*—Evaluate:

$$\frac{26.5\times 3.27}{1.9}$$

This satisfies the condition (a) aforesaid, namely, that of having one more factor in the numerator than in the denominator.

Solution:
Push hair line to 26.5 on D,
Draw 1.9 on C to hairline,
Push hairline to 3.27 on C.
Real result 45.6 on D.

the position of the decimal point being determined in the usual manner. Since the numbers on the slide rule are represented as integers it is always necessary to place the decimal point. This may be simplified by use of the powers of "ten" $(10^{+n})$. Some problems can be done by inspection, others may necessitate writing. It is understood that $(10^0)$ ten to the zero power=1. A suggested procedure in the above problem (which may be done mentally) might be:

$$\frac{26.5\times 3.27}{1.9}=$$
$$\text{approximately } \frac{30\times 3}{2}=\frac{3\times 3\times 10^1}{2}=4.5\times 10^1$$

and since $10^1$ means to move the decimal one place to the right, the approximate answer would be 45.0, and my answer 45.6 would be correct.

*Problem No. 2.*—Evaluate:

$$\frac{3.27\times 26.5}{\mathrm{Csc}\ 31°\ 45'}$$

Solution:
Push hairline to 3.27 on D
Draw 31° 45' on Csc scale under hairline
Push hairline to 26.5 on C
Read result 45.6 on D.

The result is the same as for problem No. 1 as the natural value 1.9 of the function (31° 45' Csc) could have been substituted by simply turning the rotating slide section to scale C when Csc 31° 45' was under the hairline in the second operation of the solution.

SQUARES OF FUNCTIONS

*Problem No. 3.*—Evaluate:

$$\frac{(2.5)^2\ \cot^2\ 28°\ 50'}{\mathrm{Csc}^2\ 30°}$$

Solution:
Hairline to 2.5 on D,
Draw 30° on CSC scale to hairline,
Push hairline to 28° 50' on COT scale.
Read result—5.16 on A scale, under hairline.

It will be noted that this problem does not require rewriting as would be necessary to a conventional slide rule solution in which this necessity arises because the cosecant function is not represented on the rule. So we rewrite $$\frac{(25)^2\ \cot^2\ 28°\ 50'}{\dfrac{1}{\sin^2\ 30°}}$$

Furthermore reciprocals of functions are not given in conventional slide rules thus requiring an additional rewriting.

It is obvious that the transposition of factors from the numerator to the denominator and vice versa may result in error, in any event, the fact that the problem must be rewritten discloses a limitation of the conventional slide rule, which the rule of this invention eliminates.

*Problem No. 4.*—Evaluate:

$$\frac{165\times\sqrt[3]{0.37}\times\sqrt[3]{23}\times 126.5}{52.8\times\sqrt[3]{65.4}\times\sqrt[3]{36}}$$

Push hairline to 165 on D,
Draw 52.8 on C to hairline,
Push hairline to 0.37 on KS (right),
Draw 65.4 on KS (middle) to hairline,
Push hairline to 23 on KS (middle),
Draw 36 on KS (middle) to hairline,
Push hairline to 1265 on CF.
Read result—60.7 on DF.

The problem above demonstrates how factors involving cube roots, regardless of how many times they appear in the numerator or denominator lend themselves to automatic progressive computation, requiring no rewriting or grouping of radicals with "like indexes."

*Problem No. 5.*—Evaluate:

$$\frac{\sin 13°\ \sec 60°\ \log_e 350\ \tan 27°\ 50'\ \cos 34°\ 40'\ \sqrt[3]{39.93}}{\log_e 48.8\sqrt[3]{36.6}\sqrt[3]{128.78}\ \cot 32°\ 50'\ \csc 10°\ 52'}$$

Solution:
Push hairline to 0.2250 on D (value of sin 13 taken from C or D),
Draw 48.8 on LL3 to hairline,
Push hairline to 60 on secant scale,
Draw 36.6 on B to hairline,
Push hairline to 350. on LL3,
Draw 128.78 on KS (right) to hairline, Push hairline to 27° 50' on TAN<,
Draw 32° 50' on COT. under hairline,
Push hairline to 34° 40' on COS to hairline,
Draw 10° 52' on CSC to hairline,
Push hairline to 39.93 on KS (middle).
Read result 0.00402 on D.

Sin 13° was purposely used as the first factor in this problem to show that its value could be taken from scale C.

It is important to note that in this problem every one of the six trigonometric functions are given; yet in no case was it necessary to substitute a reciprocal function, such as would usually be necessary if either the secant or cosecant functions are factors in the problem. Nor was it necessary to read the cosine or cotangent functions by color code or as complements of other functions. It is true that this or other problems involving these functions of trigonometry can be solved on other slide rules but the correct solution imposes a secondary solution of either related angles or proper conversion of reciprocal equivalent functions, or both, and which the rule of this invention eliminates.

The importance of being able to substitute the natural value of any trigonometric function at any time during the solution without referring to the reverse side of the rule or disturbing the progression of operation or the necessity of writing down a previous computation is another of the limitations of the conventional slide rule that this invention eliminates.

Log log and cubic root factors, whether they appear in the numerator or denominator, automatically convert themselves to produce a simple progressive sequence of operations in the solution of the problem.

*Problem No. 6.*—A vessel, known to be 325 feet long, with a beam of 84 feet, heading straight in our direction; observation from the point 0 reveals that the angle subtended by the arc S, which approximates the beam of the ship is 0.344 degrees. Approximate the distance to the ship.

From Trig. formula:

$$\theta = \frac{s}{r}$$

where $\theta$ is angle in radians
S the arc
$r$ the radius

Multiplying by $r$, and dividing by $\theta$, we get $r$ which is the distance =

$\frac{s}{\theta}$ substituting values $= \frac{84 \times 1}{.344 \text{ degrees}}$ Solution:
    Draw hairline to 84 on D.
Optional:
    Draw .344 on Rad $\theta$ scale to hairline (or equiv. radian value on C).
Read 14,000 feet on D (opposite index of slider).

Note: If the slide were rotated to C in the second operation we would read .006 or 6 milliradians; the equivalent radian value of .344 degree.

From this it is obvious that the value in radians may be derived automatically when the angle in degrees and minutes is given and conversely the value in degrees and minutes, when the angle is given in radians.

*Problem No. 7—Right angled and oblique triangles, solution by law of sines.*—From trigonometry: "In any triangle, the sides are proportional to the sines of the opposite angles." This law of sines may always be used, when the information known about the triangle includes: a pair of opposites, and one other element.

Example: A=62° 10'; B=38° 40'; a=18.7; to find: C; c, b. C=180° minus (A+B)=79° 10' by definition, $$\frac{a}{\sin A} = \frac{b}{\sin B}$$

and $b \sin A = a \sin B$; solving for $$b = \frac{a \sin B}{\sin A} = \frac{18.7 \sin 38° 40'}{\sin 62° 10'}$$

This conforms exactly to the condition (a) aforesaid.

Slide rule solution:
    Push hairline to 18.7 on D,
        Draw 62° 10' on SIN scale under hairline,
    Push hairline to 38° 40' on SIN scale.
Read $b = 13.2$ on D scale,
        Push hairline to 79° 70' on SIN scale.
Read $c = 20.8$ on D scale.

*Problem #8—Right angled triangle.*—Computing the tangent and solving by an optional function. Given: C=90°; a=5.92; b=12.7; to find: A; B; c.

Solution:
    By inspection arc tan $$A = \frac{5.92}{12.7}$$

is <1, angle is less than 45°.
    Draw index of TAN scale to 12.7 on D, push hairline to 5.92 on D.
Read A=25° on TAN<scale under hairline, and B (cotangent of A=65°) on COT>scale.
    Draw 25° on SIN scale under hairline.
Read $c = 14.01$ on D scale opp. 90° (index of SIN scale).

VECTORS

This slide rule is especially adapted to problems in electrical and radio engineering where vectors are used to facilitate analysis of A. C. circuits.

These vectors are expressed in terms of the rectangular components, by a complex number such as $12+j9$; or by the equivalent of the complex expression in "polar form."

VECTORS

*Method of conversion*

*Problem No. 9.*—Convert to polar form the complex number $12+j9$.

Graphically this would suggest a coordinate, with an abscissa of 12 with a projection of $j9$ on the ordinate axis.

If we form a parallelogram of the two projections, the resultant $h$ will be the diagonal of the parallelogram and "alpha" will be the phase angle.

From trigonometry:

$$h = \frac{\text{side opp angle}}{\sin \text{angle}} = \frac{9}{\sin}$$

and $$\tan \alpha = \frac{\text{side opp}}{\text{side Adj}} = \frac{9}{12}$$

Since the polar form consists of these two components, namely, the resultant ($h$) and the angle ($\alpha$), the slide rule solution which follows is simple.

Solution:
By inspection arc
$$\tan \alpha = \frac{9}{12}$$
is less than 1, and angle is less than 45°.
Draw index of TAN<scale to 12 on D, push hairline to 9 on D.
Read tan=36° 52' on TAN<scale under hairline, draw 36° 52' on SIN scale to hairline.
Read $h$=15 on D opp. 90° (index of SIN scale).

Thus the polar equivalent of
$$12+j9 = 15\underline{/36° 52'}$$

It will be noted that the computation of tangent and the resultant were accomplished in simultaneous progressive operations, as though it were a single problem.

Multiplication of vectors

Multiplication of vectors may be performed in two ways, (a) by multiplying the complex binomials, and (b) by multiplying the magnitudes of the polar form and then adding the angles. (It should be noticed that the angles are treated as exponents, viz. to multiply exponents we add them). The latter form however lend itself more readily to the slide rule.

*Problem No. 10.*—Find the polar equivalent of each term and express the product in polar form $(12+j9)$ $(20+j18)$.

Solution:
Draw index of tan<scale to 12 on D, push hairline to 9 on D.
Read tangent=36° 52' on tan<scale under hairline, draw 36° 52' on sin scale to hairline.
Read result=15 on D opposite 90° (index of SIN scale).
Therefore
$$(12+j9) = 15\underline{/36° 52'}$$

Draw index of tan<scale to 20 on D, push hairline to 18 on D.
Read tangent=42° on tan<scale under hairline, draw 42° on SIN scale under hairline.
Read result=26.9 on D.
Therefore
$$(20+j18) = 26.9\underline{/42°}$$

This gives us the expression
$$(15\underline{/36°52'})(26.9\underline{/42°})$$

Multiplying the magnitudes
$$15 \times 26.9 = \frac{15 \times 1}{\frac{1}{26.9}}$$

Push hairline to 15 on D _____ ⎫
Draw 26.9 on CI to hairline___ ⎬ Adding the angles
Read result 403.6 on D _____ ⎭  36° 52'
                                  42°
                                  ——————
                                  78° 52'

Thus the answer
$$= 403.6\underline{/78° 52'}$$

The result may be checked by multiplying the complex binomials, algebraically and then converting to polar form.

Angular velocity

*Problem No. 11.*—A flywheel has a speed of 5 revolutions per second.

Find:
(a) The angular velocity in radians per second,
(b) The angle generated in $\frac{1}{10}$ second.

Solution:
Angular velocity=$\omega=2\pi \times$ frequency of revotion per second
$$=2\pi \times 5$$
(with indexes of C and D in register).
Set hairline to 5 on $2\pi$ scale.
Read answer (a)=31.4 radians per second, on "D."
Read answer (b)=180° on "Rad $\theta$" scale.

*Problem No. 12. Calculating the value of a reactance.*—A series circuit, resonant at 1500 kilocycles, has a condenser capacity of 250 micro-microfarads, with an unknown inductance.
What is the capacitive reactance?
From formula:
$$Xc = \frac{1}{\omega C \times (10)^n}$$
where
$Xc$=Capacitive reactance in ohms
$\omega$=Omega=$2\pi \times$ frequency in cycles per second= $2\pi \times 15 \times (10)^5$
$C$=Capacity in farads=$25 \times (10)^{-11}$
$(10)^n$=Powers of ten If $Xc = \frac{1}{\omega C \times (10)^n}$; then $\frac{1}{Xc} =$
$$\omega C \times (10)^n = (2\pi \times 15 \times 10^5) \times (25 \times 10^{-11})$$
and for the slide rule we write
$$\frac{1}{Xc} = \frac{(2\pi \times 15) \times 10 - 6}{\frac{1}{25}}$$

Set hairline to 15 on $2\pi$ scale.
Read $\omega^n = 94.2^n$ on D,
Draw 25 on CI scale to hairline.
Read $Xc$=424.4 ohms on DI scale (opposite index of C scale).

It is significant that we deliberately ignored the value
$$\frac{1}{Xc}$$
on D because it is a reciprocal value, the reciprocal of which is read directly on the DI scale.

*Problem No. 13.*—What is the value of the unknown inductance in problem No. 12?
From formula, at resonance
$$Xc = X_L = \omega L = 424.4 \text{ ohms}$$
Then
$$L = \frac{424.4}{\omega} = \frac{424.4 \times 10^{-5}}{94.2}$$

Solution:
Hairline to 424.4 on D. Draw 94.2 on C to hairline.
Read answer L=45 microhenries on D.

From the above it is evident that this slide rule is admirably adapted to handle all types of resonant frequency problems.

*Problem No. 14.—*
Find $$\sqrt[7.25]{(0.45)^{20.83}}$$

Solution:

$$\frac{\text{rewrite } 20.83 \log 0.45}{7.25}$$

Set hairline to 0.45 on LLO₃. Draw 7.25 on C to hairline. Set hairline to 20.83 on C. Read answer=.101 on LLO₄.

Since 0.45 is raised to a power greater than unity, the answer is smaller than .45.

*Problem No. 15.—*Finding the value of a negative power of $e$ $$e - \left( \frac{\text{colog } e\ 0.45 \log e\ 25 \tan 45°}{\sin 3° 22'\ \text{CSC } 10° 21'} \right)$$

(a) Find the negative power of $e^{(-x)}$
(b) Find the value of $e^{-x}$
Solution:
  Set hairline to 0.45 on LLO₃,
  Draw 3° 22' on S & T scale to hairline,
  Set hairline to 25 on LL₃,
  Draw 10° 21' on CSC to hairline,
  Runner to 45° on TAN scale (index).
Read ans. (a) $e^{-7.867}$ on D scale (under hairline).
Read ans. (b) $e^{-7.867} = 0.000383$ on LLO₄ (also under hairline).

The full unit scales LLO₁₋₂₋₃₋₄ of this invention referred to full unit D scale eliminates the necessity of moving the runner to find the various negative powers of $e$. This can not be done on conventional slide rules because Log log scales of decimal quantities are referred to the two unit "A" scale on the conventional rule.

Example: If the hairline is set to 5 on the rule of this invention directly under hairline we read:

$$e^{-5} = 0.0067$$
$$e^{-0.5} = 0.6065$$
$$e^{-0.05} = 0.9512$$
$$e^{-0.005} = 0.99501$$

whereas two settings of the runner, one on the left, and one on the right side of "A" scale, are necessary on the conventional rule, and because the readings are read on a two unit scale, the answer cannot be read as accurately as on the rule of this invention.

It will be obvious from the foregoing description and solutions of illustrative problems that the present invention embodies new scales of full unit, or one-cycle, length used in association with usual scales which permit continuous and accurate computation of problems resulting in a complete solution without the necessity of such preliminary rewriting of the problem as is required in the use of scales of the prior art.

All of the novel scale arrangements and new scales may obviously be employed in a double face slide rule in the manner herein described having two relatively movable straight members, a one-cycle logarithmic scale on each member which comprise also (a) trigonometric scales on one of said members giving readings of the values of trigonometric functions on said logarithmic scales, a logarithmic scale of the logarithms of numbers greater than unity the numerical values of such logarithms being read on said one cycle logarithmic scale and a logarithmic scale of the cologarithms of numbers less than unity the numerical values of such cologarithms being read on said one cycle logarithmic scale; (b) trigonometric scales on one of said members giving readings of the values of trigonometric direct functions on said logarithmic scales, and trigonometric scales on one of said members giving readings of the values of trigonometric co-functions on said logarithmic scales; (c) a sine scale, a co-sine scale, tangent scales of angles respectively greater and smaller than 45°, a co-secant scale, a secant scale and co-tangent scales of angles respectively greater and smaller than 45° all giving values of the corresponding trigonometric functions on said one cycle logarithmic scales; (d) trigonometric scales on one of said members giving readings of the values of trigonometric functions on said logarithmic scales, a logarithmic scale of the logarithms of numbers greater than unity the numerical values of such logarithms being read on said one cycle logarithmic scale, the value $e$ on said logarithmic scale of the logarithms of numbers greater than unity being at the index of said one cycle logarithmic scale, and a logarithmic scale of the cologarithms of numbers less than unity the numerical values of such cologarithms being read on said one cycle logarithmic scale; (e) a logarithmic scale on said body member of the co-logarithms of numbers less than unity, the numerical values of such co-logarithms being read on said one cycle logarithmic scale; (f) a one-cycle logarithmic scale folded with the value of 572 at the index of said one-cycle logarithmic scale, said folded scale representing values in degrees, of values in radians on the one-cycle scale which is on the same member with said folded scale; and (g) a one-cycle logarithmic scale folded with the value 572 at the index of said one-cycle logarithmic scale, said folded scale representing the values in degrees and decimal fractions thereof, of values in radians on the one cycle scale which is on the same member with the said folded scale, and also the values in degrees or fractions thereof of the values of sines and tangents which are less than a magnitude of 5° 44' which is read on the same member with the same folded scale.

By reason of the present invention the faces on the body of the slide rule and the several faces of the polygonal slide rule may be provided with complementary scales suitable for the computations to be progressively made and the proper face or faces of the slide readily moved by rotation of the slide into proper cooperative relation and into the plane of the complementary scale upon the face of the rule. The slide may also be rotated during the computation to continue the computation from the result obtained upon cooperating faces to different cooperating faces until the solution is complete without the necessity of removing the slide from the body and replacing it with another selected face bearing a selected scale in cooperative relation to that upon which the partial solution has been effected.

It will be understood that while the faces of the body as illustrated and described herein are provided respectively with certain designated logarithmic scales that additional logarithmic scales may be substituted for or added to the scales herein designated and thereby adapt the scales to solution of special problems for which those above described are not applicable, or which may simplify the procedure in solving a problem.

It will therefore be understood that the particular embodiment of the invention shown and described herein is of an illustrative character and that various changes in the construction of the rule and particularly the number of faces of the polygonal slide and the scales applied thereto may be made within the spirit and scope of the following claims.

Having thus described the invention, what is claimed as new, and desired to be secured by Letters Patent, is:

1. A slide rule comprising a body having a straight flat face provided with a recess extending longitudinally intermediate of the width thereof and dividing said face into spaced parallel scale sections lying in the same plane, scales on the respective scale sections, a polygonal slide longitudinally and rotatably movable in said recess having flat faces carrying scales selectively movable into the space between and into the plane of the scales of said body section and a runner having a flat plate provided with a hairline cooperating with suitable scales on said body and slide to perform a computation and yieldable means normally holding said plate in close proximity to the plane of the cooperating scales but enabling said plate to be raised and lowered relatively thereto to permit rotative positioning of another face and the scale on said face of said polygonal slide in said plane.

2. A slide rule in accord with claim 1 having means for holding said slide against rotation when a selected flat face of said slide is in the plane of the face of said body.

3. A slide rule comprising a body having a flat face and an undercut recess extending longitudinally medially of the width thereof dividing said face into sections having spaced inner thin parallel edges in the same plane, scales on said sections, a slide housing mounted in and movable lengthwise of said recess, a poylgonal slide rotatably mounted in said housing having a plurality of flat faces carrying scales selectively rotatable into the space between the edges of said body and into the plane of the face sections thereof whereby different scale bearing faces on said slide may be positioned to co-act with a scale upon a body section to enable successive computations to be performed, and cooperating means on said housing and rotatable slide for releasably locking the slide against rotation when a selected face thereof lies in the same palne as the face of said body and a runner having a flat transparent plate provided with a hairline adapted to cooperate with the selected co-acting scales and having yieldable means normally holding the plate in proximity to the plane of the cooperating scales, but enabling said plate to be raised and lowered by rotation of the slide to position different scale bearing faces thereof in said plane.

4. A slide rule comprising a body having spaced parallel side bars with parallel front and back flat faces with complementary inner guideways in the side bars, scales on each face of said side bars, a polygonal slide mounted in said guideway and longitudinally and rotatably movable therein having symmetrical flat faces selectively and rotatably movable into the plane of either the front or back flat faces of said body and provided with scales and a yieldable runner carried on said parallel side bars having a hairline to cooperate with the scales on the flat faces of said parallel side bars and the scales upon the respective faces of said slide which are in the plane of the front and back flat faces of said parallel side bars.

5. A slide rule comprising a body having spaced parallel side bars with parallel front and back flat faces with complementary inner guideways in the side bars, scales on each face of said side bars, a polygonal slide mounted in said guideway and longitudinally and rotatably movable therein having symmetrical flat faces selectively and rotatably movable into the plane of either the front or back flat faces of said body and provided with scales adapted to cooperate with a scale upon one of the face sections of said body to perform a computation, and a runner slidably mounted on said body having hairlines cooperating respectively with scales upon the front and back faces of said body and with co-acting scales of said slide and means yieldably connecting said hairlines to permit rotation of said polygonal slide thereby enabling a computation to be performed by co-acting scales on one side of the slide rule and to be transferred to the reverse side of the rule and continuing computation performed upon said reverse side.

6. A slide rule comprising a body having parallel side bars presenting flat front and back parallel faces provided with scales and having inner opposing guideways, means rigidly securing said side bars in predetermined spaced relation, a slide housing mounted in said guideway and movable longitudinally thereof having oppositely disposed inner cylindrical concave surfaces, a polygonal slide rotatably mounted in said housing having flat faces adapted to be selectively positioned in the plane of the respective faces of said body and having scales respectively adapted to co-act with one or more of the scales on the respective faces of the body, a runner having transparent flat plates provided with hairlines normally held in close proximity to the respective planes of the front and back faces of the side bars, and means yieldably connecting said flat plates to enable separation of the plates relatively to said plane by rotation of the polygonal slide and thereby position other faces of the slide in the respective planes.

7. A slide rule comprising a body having parallel side bars presenting flat front and back parallel faces, means connecting the ends of said side bars in suitably spaced relation, scales on the faces of the respective side bars, complementary re-entrant guideways along the inner edges of said side bars, a slide housing having spaced side members connected at their ends by heads fitting and movable longitudinally in said guideways and having complementary cylindrical concave inner walls, a rotatable polygonal slide axially journaled in said heads having flat faces provided with scales to coact with the scales on said side the scales on said side bars when positioned in the spaces between and respectively in the planes of the front and back faces of said side bars a runner having transparent flat plates provided with hairlines normally held in close proximity to the respective planes of the front and back faces of the side bars, and means yieldably connecting said flat plates to enable separation of the plates relatively to said plane by rotation of the polygonal slide and thereby position other faces of the slide in the respective planes.

8. A slide rule comprising a body having parallel side bars presenting flat front and back parallel faces, scales on the faces of the respective side bars, complementary re-entrant guideways along the inner edges of said side bars, a slide housing having spaced side members connected at their ends by heads fitting and movable longitudinally in said guideways and having complementary cylindrical concave inner walls, a rotatable polygonal slide axially journaled in said heads having flat faces provided with scales to coact with the scales on said side bars when positioned in the space between and in the plane of the faces of said side bars, and means connecting the ends of the side bars having central arched portions to permit rotation of the polygonal slide, and for adjusting the connections of said side bars to provide proper frictional engagement between said housing and said side bars, while allowing for rotation of the polygonal slide.

9. A slide rule comprising a body having parallel side bars connected at their ends in suitably spaced relation and having front and back parallel flat faces each provided with scales, the inner edges of said side bars having complementary longitudinally extending re-entrant recesses forming guideways and providing said side bars with thin inner edges, a housing mounted in and movable longitudinally of said guideways, a polygonal slide rotatably mounted in said housing having a plurality of diametrically opposite parallel flat faces adapted substantially to fit the opposite spaces between the faces of said side bars and to lie respectively in the planes of the front and back faces thereof, scales on each of the faces of said slide adapted to co-act with one or more scales upon the respective faces of the side bar to perform the computation, a runner having relatively yieldable parallel members, provided with means for allowing rotation of the polygonal slide, slidably mounted on said side bars and having like hairlines cooperating with the scales upon the upper and lower faces of the side bars and the scales on the faces of the slide positioned therebetween, and means for releasably holding the rotatable slide against rotation when selected faces thereof are positioned in the spaces between the front and back faces of the body.

10. A slide rule comprising a body having spaced parallel side bars with parallel front and back flat faces with complementary inner guideways in the side bars, scales on each face of said side bars, a polygonal slide mounted in said guideway and longitudinally and rotatably movable therein having symmetrical flat faces selectively and rotatably movable into the plane of either the front or back flat faces of said body and provided respectively with scales complementary to and adapted to cooperate with a scale upon the face of said body to perform a computation, a runner slidably mounted on said side bars having complementary hairlines cooperating respectively with the scales on the respective faces of the side bars and of the slide, and resilient means connecting said index members yieldably to permit rotation of the polygonal slide.

11. A slide rule comprising a body having spaced parallel side bars with parallel front and back flat faces with complementary inner guideways in the side bars, scales on each face of said side bars, a polygonal slide mounted in said guideway and longitudinally and rotatably movable therein having symmetrical flat faces selectively and rotatably movable into the plane of either the front or back flat faces of said body and provided respectively with scales complementary to and adapted to cooperate with a scale upon the face of said body to perform a computation, a runner slidably mounted on said side bars having parallel transparent plates provided with complementary hairlines cooperating respectively with the scales on the respective faces of the side bars and of the slide, spacing members normally positioning the ends of said transparent plates in close proximity to the respective faces of the side bars, and resilient means in said spacing members yieldably connecting the ends of the transparent plates to permit rotation of the polygonal slide.

12. A slide rule comprising a body having spaced parallel side pars with parallel front and back flat faces with complementary inner guideways in the side bars, scales on each face of said side bars, a polygonal slide mounted in said guideway and longitudinally and rotatably movable therein having symmetrical flat faces selectively and rotatably movable into the plane of either the front or back flat faces of said body and provided respectively with scales complementary to and adapted to cooperate with a scale upon the face of said body to perform a computation, a runner slidably mounted on said side bars having parallel transparent plates provided with complementary hairlines cooperating respectively with the scales on the respective faces of the side bars and of the slide, complementary brackets mounted on the respective ends of the transparent plates, springs connecting the complementary brackets, housings enclosing the respective complementary brackets normally spacing the transparent plates in close proximity to the respective faces of the side bars, and resilient means frictionally engaging the respective outer edge of one of the side bars.

13. A slide rule comprising a body having spaced parallel side bars with parallel front and back flat faces with complementary inner guideways in the side bars and longitudinal grooves in the outer edges of said side bars, scales on each face of said side bars, a polygonal slide mounted in said guideway and longitudinally and rotatably movable therein having symmetrical flat faces selectively and rotatably movable into the plane of either the front or back flat faces of said body and provided respectively with scales complementary to and adapted to cooperate with a scale upon the face of said body to perform a computation, a runner slidably mounted on said side bars having transparent plates provided with like hairlines located in a plane normal to the faces of said side bars cooperating respectively with the scales on the respective faces of the side bars and of the slide, complementary rectangular brackets mounted on the respective ends of said plates, springs connecting said complementary brackets, rectangular housings enclosing the respective complementary brackets normally spacing said plates in close proximity to the respective faces of the side bars and leaf springs on said housings engaging respectively the outer grooves in the side bars.

14. A slide rule comprising a body having spaced parallel side bars with parallel front and back faces and having complementary inner guideways, a polygonal slide mounted in said guideway longitudinally and rotatably movable therein, having symmetrical flat faces selectively and rotatably movable into the plane of either the front or back faces of said body without removing the slide from the body, logarithmic scales on each face of said side bar including continuous log log scales of decimal quantities of full unit length on one face and representing logarithms of cologarithms of numbers less than unity, logarithmic scales upon the respective faces of said slide including scales of one, two and three unit length, logarithmic scales representing logarithms of logarithms of numbers, direct reading scales representing the sine, co-sine, tangent, co-tangent, secant, and co-secant functions, all of which are full unit length and a runner slidably mounted on said body, and yieldably constructed to allow rotation of the polygonal slide, having hairlines cooperating respectively with complementary scales upon the front and back faces of said body and co-acting scales of said slide thereby enabling a computation to be performed by co-acting scales on one side of the body and the adjacent face of the slide and thereupon to be transferred to co-acting scales upon the reverse side of said body and the face of the slide adjacent thereto without interrupting the sequence of progressive operations necessary to the solution of a problem.

15. A slide rule comprising a body having spaced parallel side bars with parallel front and back faces and having complementary inner guideways, a polygonal slide mounted in said guideway longitudinally and rotatably movable therein, having symmetrical flat faces selectively and rotatably movable into the plane of either the front or back faces of said body without removing the slide from the body, logarithmic scales on each face of said side bar including continuous log log scales of decimal quantities of full unit length on one face and representing logarithms of cologarithms of numbers less than unity, logarithmic scales upon the respective faces of said slide including scales of one, two and three unit length, scales of the logarithms of logarithms of numbers, direct reading scales representing the sine, cosine, tangent, co-tangent, secant, and co-secant functions, all of which are full unit length and also folded and folded inverted logarithmic scales of full unit length, and a runner slidably mounted on said body, and yieldably constructed to allow rotation of the polygonal slide, having hairlines cooperating respectively with complementary scales upon the front and back faces of said body and co-acting scales of said slide thereby enabling a computation to be performed by co-acting scales on one side of the body and the adjacent face of the slide and thereupon to be transfered to co-acting scales upon the reverse side of said body and the face of the slide adjacent thereto without interrupting the sequence of progressive operations necessary to the solution of a problem.

16. In a sliding bar slide rule having two relatively movable straight members, a one cycle logarithmic scale on each member and a one cycle logarithmic scale folded with the value 572 at the index of said one cycle logarithmic scale, said folded scale representing values in degrees, of values in radians on the one cycle scale which is on the same member with the said folded scale.

17. In a slide rule having two relatively movable members, a one cycle logarithmic scale on each member, a folded one cycle logarithmic scale on one of said members, a logarithmic scale of the co-logarithms of numbers less than unity on the one of said members other than that carrying said folded one cycle logarithmic scale, the numerical values of such co-logarithms of numbers less than unity to a predetermined selected base being read on a one cycle logarithmic scale, the numerical values of such co-logarithms to any other desired base being read on the folded one cycle logarithmic scale when the graduation representing unity on said folded scale is in alignment with the graduation representing the reciprocal of the desired base on said logarithmic scale of the co-logarithms of numbers less than unity, a logarithmic scale of the logarithms of numbers greater than unity on one of said members the numerical values of such logarithms to a predetermined selected base being read on a one cycle logarithmic scale.

18. In a slide rule having two relatively movable members, a one cycle logarithmic scale on each member, a folded one cycle logarithmic scale on one of said members, a logarithmic scale of the co-logarithms of numbers less than unity on the one of said members other than that carrying said folded one cycle logarithmic scale, the numerical values of such co-logarithms of numbers less than unity to a predetermined selected base being read on a one cycle logarithmic scale, the numerical values of such co-logarithms to any other desired base being read on the folded one cycle logarithmic scale when the graduation representing unity on said folded scale is in alignment with the graduation representing the reciprocal of the desired base on said logarithmic scale of the co-logarithms of numbers less than unity, a logarithmic scale of the logarithms of numbers greater than unity on one of said members the numerical values of such logarithms to the predetermined selected base being read on a one cycle logarithmic scale, said logarithmic scale of the logarithms of numbers greater than unity having opposite the index of a one cycle logarithmic scale the graduation which corresponds to the reciprocal of the graduation of the value on the logarithmic scale of the co-logarithms of numbers less than unity which is opposite the index of its one cycle logarithmic scale.

19. In a slide rule having two relatively movable members, a one cycle logarithmic scale on each member, a series of scales graduated in the angular values of the trigonometric functions the numerical values of which trigonometric functions are read on the one cycle logarithmic scale which is on the same member, a folded one cycle logarithmic scale on one of said members, a logarithmic scale of the co-logarithms of numbers less than unity on the one of said members other than that carrying said folded one cycle logarithmic scale, the numerical values of such co-logarithms of numbers less than unity to a predetermined selected base being read on a one cycle logarithmic scale, the numerical values of such co-logarithms to any other desired base being read on said folded one cycle logarithmic scale when the graduation representing unity on said folded scale is in alignment with the graduation representing the reciprocal of the desired base on said logarithmic scale of the co-logarithms of numbers less than unity, a logarithmic scale of the logarithms of numbers greater than unity on one of said members the numerical values of such logarithms to a predetermined selected base being read on a one cycle logarithmic scale.

20. In a slide rule having two relatively movable members, a one cycle logarithmic scale on each member, a series of scales graduated in the angular values of the trigonometric functions the numerical values of which trigonometric functions are read on the one cycle logarithmic scale which is on the same member, a logarithmic scale of the co-logarithms of numbers less than unity on one of said members, the numerical values of such co-logarithms of numbers less than unity to a predetermined selected base being read on a one cycle logarithmic scale, a logarithmic scale of the logarithms of numbers greater than unity on one of said members, the numerical values of such logarithms to the predetermined selected base being read on a one cycle logarithmic scale, said logarithmic scale of the logarithms of numbers greater than unity having opposite the index of the one cycle logarithmic scale the graduation which corresponds to the reciprocal of the graduation of the value on the logarithmic scale of the co-logarithms of numbers less than unity which is opposite the index of its one cycle logarithmic scale.

21. In a slide rule having two relatively movable members, a one cycle logarithmic scale on each member, a series of scales giving values of the trigonometric functions on the one cycle logarithmic scale which is on the same member, said trigonometric scales comprising a scale graduated in angles up to 90° giving the value of trigonometric sine functions on said one cycle logarithmic scale, a scale graduated in angles up to 45° giving the values of the trigonometric tangent function on said one cycle logarithmic scale, and a scale graduated in angles above 45° giving the values of the trigonometric tangent function on said one cycle logarithmic scale.

22. In a slide rule having two relatively movable members, a one cycle logarithmic scale on each member, a series of logarithmic scales of the co-logarithms of numbers less than unity on one of said members, the numerical values of such co-logarithms of numbers less than unity to a predetermined selected base being read on one of said cycle logarithmic scales, each scale of the series of logarithmic scales of the co-logarithms of numbers less than unity being identified by a common symbol and by one of a series of ordinal symbols which denotes the relation of each scale of the series with respect to unity, a series of logarithmic scales of the logarithms of numbers greater than unity to a predetermined selected base on one of said members the numerical values of such logarithms of numbers greater than unity being read on one of said one cycle logarithmic scales, each scale of the series of logarithmic scales of the logarithms of numbers greater than unity being identified by a common symbol different from the first mentioned common symbol and by one of a series of ordinal symbols which denotes the relation of each scale of this series with respect to unity.

JEREMIAH F. AILINGER.

REFERENCES CITED

The following references are of record in the file of this patent:

UNITED STATES PATENTS

| Number | Name | Date |
|---|---|---|
| 907,373 | Keuffel | Dec. 22, 1908 |
| 980,412 | Gibson | Jan. 3, 1911 |
| 1,150,771 | Keuffel | Aug. 17, 1915 |
| 1,488,686 | Keuffel | Apr. 1, 1924 |
| 1,942,349 | Wompner | Jan. 2, 1934 |
| 2,170,144 | Kells et al. | Aug. 22, 1939 |
| 2,285,722 | Kells et al. | June 9, 1942 |

FOREIGN PATENTS

| Number | Country | Date |
|---|---|---|
| 152,123 | Austria | Dec. 27, 1937 |
| 492,010 | Germany | Feb. 15, 1930 |

OTHER REFERENCES

Pages 19–33 of "Special Slide Rules" by J. N. Arnold. This comprises Bulletin No. 32 of the Engineering Extension Dept. of Purdue University of Lafayette, Indiana.